United States Patent [19]
Black

[11] 3,909,043
[45] Sept. 30, 1975

[54] THREE WHEEL VEHICLE

[76] Inventor: Marion Homer Black, 2900 W. Lincoln St., Apt. E 210, Anaheim, Calif. 92801

[22] Filed: Apr. 8, 1974

[21] Appl. No.: 458,912

[52] U.S. Cl. ............................. 280/269; 280/282
[51] Int. Cl. ...................... B62k 9/02; B62k 11/00
[58] Field of Search ............ 280/269, 259, 267, 88, 280/282; 180/25 R

[56] References Cited
UNITED STATES PATENTS

| | | | |
|---|---|---|---|
| 1,598,869 | 9/1926 | McCann | 280/259 |
| 2,388,692 | 11/1945 | House | 280/88 X |
| 2,574,199 | 11/1951 | Tandler et al. | 180/25 R |
| 2,812,194 | 11/1957 | Ajero | 280/269 X |
| 2,986,406 | 5/1961 | Kahl | 280/267 X |
| 3,062,559 | 11/1962 | Hewitt | 280/282 X |
| 3,100,020 | 8/1963 | Sonntag | 180/25 R |
| 3,311,388 | 3/1967 | Ryan et al. | 280/269 |
| 3,429,584 | 2/1969 | Hendricks | 280/269 |

*Primary Examiner*—Leo Friaglia
*Attorney, Agent, or Firm*—Irvin A. Lavine

[57] ABSTRACT

A three wheeled vehicle is provided having a chassis generally triangular in plan form and having a pair of dirigible rear wheels at two corners thereof. A powered front wheel is carried by an extension member extending forwardly from the other corner. A seat is mounted on the chassis, facing toward the powered wheel, and a steering wheel is in front of the seat, connected to the dirigible wheels by a chain. The front power wheel is driven by pedals, or by a suitable power source such as a gasoline engine.

7 Claims, 3 Drawing Figures

U.S. Patent  Sept. 30,1975  3,909,043

THREE WHEEL VEHICLE

BACKGROUND OF THE INVENTION

The present invention relates to a three wheeled vehicle.

There have been provided in the prior art a number of three wheeled vehicles, usually for the transportation of a single passenger. In the most well known of such vehicles, the child's tricycle, there is a front wheel which is steered by handle bars, and having pedals attached to it. The control of the front wheel is through a steering column or post, which is generally located above the wheel, with a frame extending downwardly and rearwardly from the post holding the steering column, being joined at its lower end by a transverse axle on which two rear wheels are journalled. The seat is positioned on this downwardly extending frame, so that the child's legs extend generally downwardly and forwardly, to the driving pedals.

Such tricycles have had a number of deficiencies, including a relatively high center of gravity, therefore having a tendency to tip over, especially when a sharp turn is made at high speeds. Further, there is a drawback in this construction because the front wheel is used for both steering and driving, and because of the fact that there is front wheel steering, the steering is less sensitive than might be desirable in some instances. Such instances, in particular, are where there is a necessity for providing a highly maneuverable vehicle capable of very sharp turns, but still maintaining good stability.

SUMMARY OF THE INVENTION

The present invention provides a three wheeled vehicle having a chassis which is of generally planar configuration, substantially parallel to the ground. In plan form, the chassis is triangular, and there is a dirigible wheel at each of two rear corners. A seat is fastened to the triangular chassis, being preferably directly connected to it, so that the bottom of the seat is fastened directly to the chassis, without any intervening legs or the like which would elevate the seat bottom above the chassis. In front of the seat, at a forward apex of the triangle, is a steering column, extending generally vertically, and being controlled by a suitable device, such as a steering wheel mounted at the top of the column. At the bottom of the column, there is a sprocket, and the dirigible steering wheels at the rear of the chassis are provided with posts on which there are sprockets. A continuous chain extends between the three sprockets for providing rotational movement of the two dirigible steering wheels upon rotation of the wheel at the top of the steering column. Further, a pair of telescopic bars extend forwardly from the front apex, preferably at a slight upward angle, to support at their forward ends the axle of a front driving wheel. In one embodiment, the wheel is provided with pedals for driving the vehicle, while in another embodiment, an internal combustion engine or the like is supported on a platform above the front driving wheel, and is chain-connected to the wheel, to drive it.

Among the objects of the present invention are the provision of a three wheel vehicle having great stability, through a low center of gravity.

Yet another object of the present invention is the provision of a three wheel vehicle having a very sensitive and very positive steering control, for sensitive steering of the vehicle.

Yet another object of the present invention is to provide a three wheel vehicle adaptable to persons having different lengths of legs.

Other objects and many of the attendant advantages will be readily understood from consideration of the description of the invention contained in the specification and claims appended hereto, and in the drawings.

DESCRIPTION OF THE PREFERRED EMBODIMENTS

Figure 1:
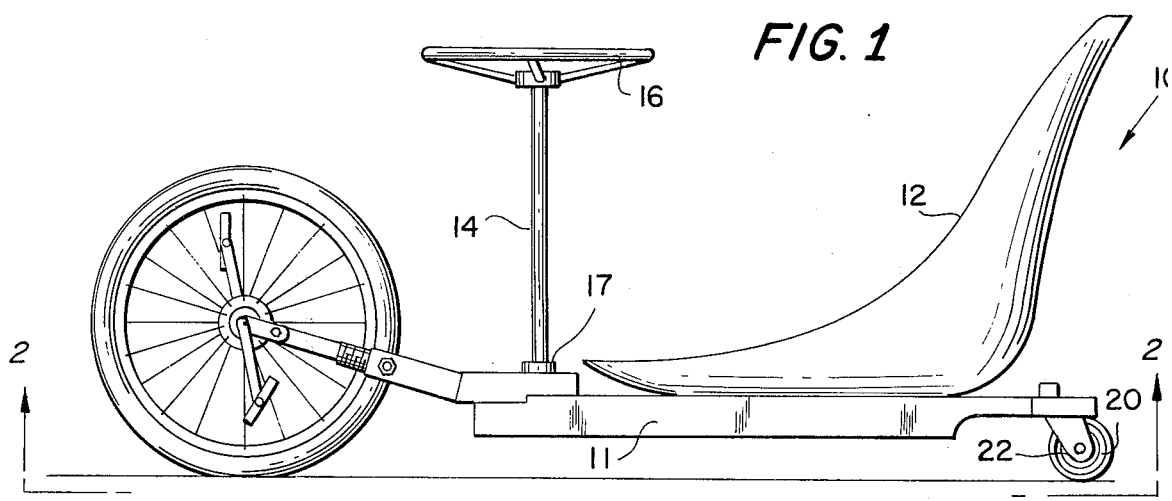
FIG. 1 is an elevational view of a three wheel vehicle in accordance with the present invention.

Referring now to the drawings, wherein like or corresponding reference numerals are used for like or corresponding parts throughout the several views, there is shown in FIG. 1 a three wheel vehicle generally designated 10 and comprising a substantially horizontal chassis 11. As may be seen in FIG. 2, the chassis 11 is substantially triangular in plan form. A seat 12 is provided on the chassis 11, preferably being mounted thereon directly so as to provide for a very low center of gravity of the vehicle both when empty or vacant, and with a person in the seat 12. To that end, the bottom of the seat 12 may be directly connected to the chassis 11, as by the fastener 13 shown in FIG. 2. The seat 12 faces towards the front or first corner of the triangular chassis 11, adjacent to which is positioned a rotatable steering column 14, having a steering wheel 16 mounted at the top thereof, and rotatably supported by bearings 17 in conventional fashion at the front corner or apex of the triangular chaSsis 11.

Figure 2:
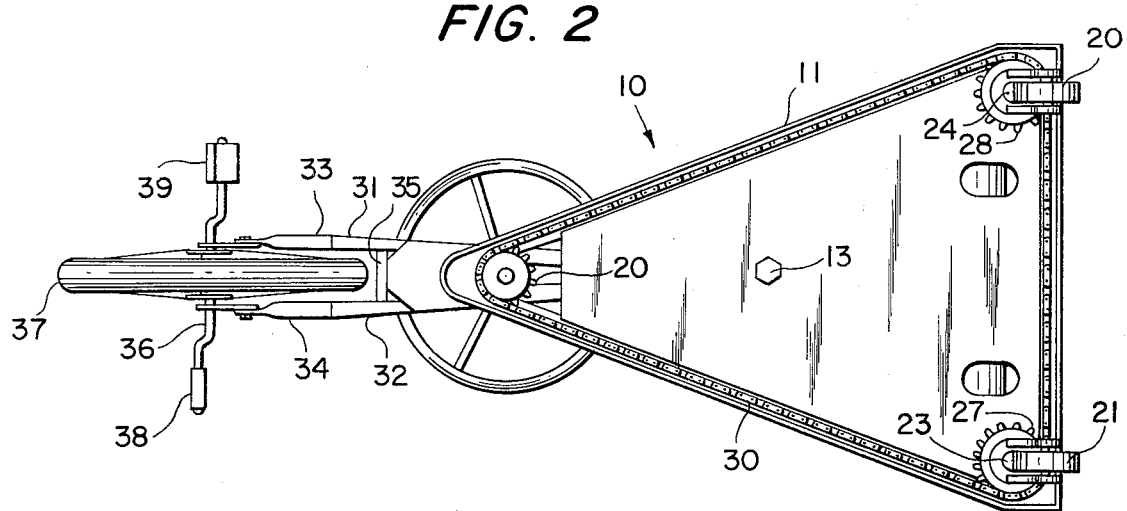
FIG. 2 is a view taken on the line 2—2 of FIG. 1.

Referring now to FIG. 2, there may be seen the two dirigible wheels 20 and 21 provided at the rear corners of the triangular chassis 11, these wheels being preferably of the caster type, and having rearwardly extending forks 22 (see FIG. 1) for supporting the wheels 20, and an upstanding post 23 for the wheel 21 and corresponding post 24 for the wheel 20. The posts 23 and 24 preferably extend substantially vertically, as does the column 14.

A sprocket 26 is mounted on the post 14, a sprocket 27 is mounted on the post 23 and a sprocket 28 is mounted on the post 24, and a drive chain 30 of continuous construction engages the three said sprockets. Accordingly, movement of the wheel 16 will cause dirigible or steering movement of the wheels 20 and 21, through the chain 30 and the noted sprockets.

Extending forwardly from the front corner or apex of triangular chassis 11 are a pair of generally parallel, spaced tubular members 31 and 32, receiving bars 33 and 34 in them respectively, thereby constituting telescopic bars. Suitable holes are drilled through these members, through which a fastener 35 may pass, for purposes to be explained hereinbelow.

The bars 33 and 34 carry at their front ends an axle 36 of a driving wheel 37, which is provided with pedals 38 and 39 for driving the vehicle 10. The telescopic bars above described may be adjusted in length, so as to accommodate persons having different lengths of legs.

As above explained, steering control will be effected by the steering wheel 16, rotating the steering column 14 and thereby driving the chain 30 through the sprocket 20, and causing steering movement of the dirigible wheels 20 and 21. The vehicle is propelled by pedaling through the pedals 38 and 39, thereby driving the front driving wheel 37. Hence, the construction herreinabove described is of a low cost, highly stable and highly maneuverable three wheel vehicle.

Figure 3:
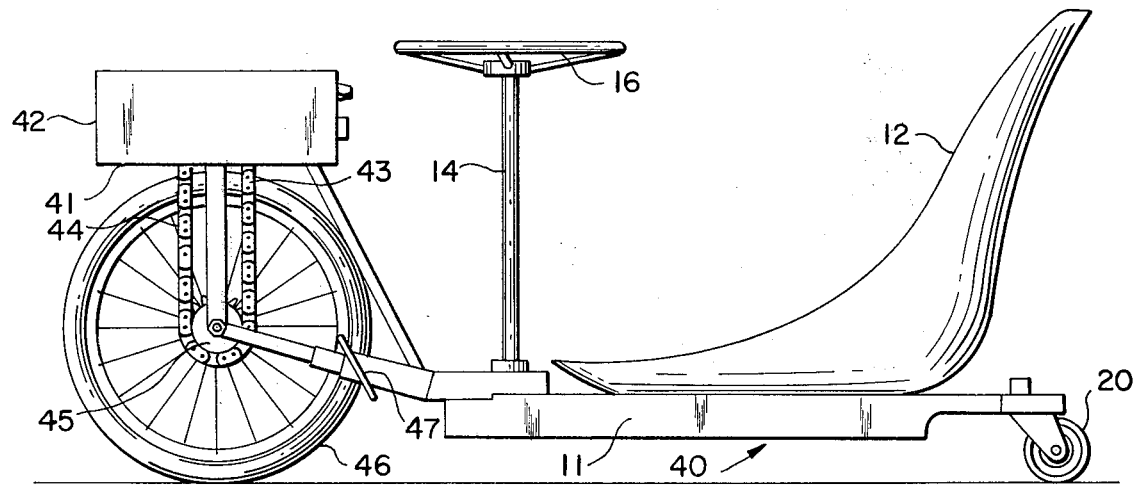
FIG. 3 is a view similar to FIG. 1, showing an alternate embodiment of the invention.

Referring now to FIG. 3, there is shown a second embodiment of the vehicle, generally designated 40, and provided with seat 12, steering columns 14, steering wheel 16, chassis 11 and rear steering wheels 20 and 21 as in the embodiment of FIGS. 1 and 2. The vehicle 40 also includes the chain drive of the dirigible wheels, as shown in FIG. 2. However, the vehicle 40 is driven by an internal combustion engine or similar prime mover supported on a platform 41 and carried within a housing 42. The platform 41 is supported from the telescopic bars extending forwardly from the front apex, from which extend generally vertical support members 43. A chain 44 drivingly connects the output shaft and appropriate sprocket of the prime mover with a corresponding sprocket 45 on the driving wheel 46. Foot rests 47 may be provided for supporting the feet of the occupant of the vehicle 40, and suitable controls (not shown) of the engine may be provided, such as a clutch and throttle, to facilitate the operation of the vehicle 40. As will be understood, the vehicle 40 will have adequate speed for enjoyment of the occupant, while having very sensitive control, and a very low center of gravity, so as to be stable, particularly during relatively high speed turning movements. Also, the ability to rotate the rear wheels through 360° enables the vehicle 40 to be turned on a radius of approximately its own length, thereby making it highly maneuverable.

There has been provided a three wheel vehicle having a very stable construction, due to its low center of gravity, while also providing quick and sensitive steering. Consequently, the vehicle may be operated so as to cause it to make relatively quick and high speed turns, with greatly reduced liability of overturning, in comparison with known three wheel vehicles. The vehicles herein provided are of simple construction, being very economical, and may be either pedaled or driven by a suitable source of power, such as an internal combustion engine.

It will be obvious to those skilled in the art that various changes may be made without departing from the spirit of the invention and therefore the invention is not limited to what is shown in the drawings and described in the specification but only as indicated in the appended claims.

I claim:

1. A three vehicle of high maneuverability and low center of gravity comprising:
a substantially horizontal chassis generally triangular in plan form,
a seat on said chassis facing toward a first corner of said chassis, said seat having a bottom, and means attaching said seat bottom to said chassis in close proximity thereto,
a steering column at said first corner mounted for rotation on its own axis, a dirigible wheel at each said other corners of said chassis means including flexible tension means for connecting said wheels with said column for simultaneous steering movement upon rotation of said steering column,
a non-dirigible driving wheel,
means for supporting said driving wheel at the said first corner of said chassis, forwardly thereof and having its axis above the level of said chassis and seat bottom, and means for rotating said driving wheel on its own axis.

2. The vehicle of claim 1, said driving wheel rotating means comprising pedals connected to said driving wheel.

3. The vehicle of claim 2, said means for connecting said dirigible wheels with said column comprising sprockets on the column and on posts of said dirigible wheels, and a continuous chain trained on said sprockets.

4. The vehicle of claim 3, said posts on said dirigible wheels and said column being parallel.

5. The vehicle of claim 1, said driving wheel supporting means comprising means for adjusting the distance between the axis of said driving wheels and said seat.

6. The vehicle of claim 5, said last mentioned means comprising telescopic bars extending forwardly of said first corner of said chassis.

7. The vehicle of claim 1, said last mentioned means comprising a source of energy supported on said vehicle and operatively connected to said driving wheel.

* * * * *